(12) United States Patent
Krishnan

(10) Patent No.: US 10,588,062 B2
(45) Date of Patent: Mar. 10, 2020

(54) AUTOMATICALLY MODIFYING CELL DEFINITION TABLES WITHIN NETWORKS

(71) Applicant: T-Mobile USA, Inc., Bellevue, WA (US)

(72) Inventor: Reman Krishnan, Charlotte, NC (US)

(73) Assignee: T-Mobile USA, Inc., Bellevue, WA (US)

( * ) Notice: Subject to any disclaimer, the term of this patent is extended or adjusted under 35 U.S.C. 154(b) by 6 days.

(21) Appl. No.: 15/916,711

(22) Filed: Mar. 9, 2018

(65) Prior Publication Data

US 2019/0281514 A1    Sep. 12, 2019

(51) Int. Cl.
| H04W 12/00 | (2009.01) |
| H04W 36/00 | (2009.01) |
| H04W 24/02 | (2009.01) |
| H04W 8/08 | (2009.01) |
| H04L 12/911 | (2013.01) |
| H04W 76/18 | (2018.01) |

(52) U.S. Cl.
CPC ....... *H04W 36/0083* (2013.01); *H04L 47/745* (2013.01); *H04L 47/746* (2013.01); *H04W 8/08* (2013.01); *H04W 24/02* (2013.01); *H04W 76/18* (2018.02)

(58) Field of Classification Search
CPC ... H04W 36/0083; H04W 76/18; H04W 8/08; H04W 24/02; H04L 47/745; H04L 47/746
USPC ...................................................... 370/331
See application file for complete search history.

(56) References Cited

U.S. PATENT DOCUMENTS

| 9,924,418 | B1* | 3/2018 | Cuberovic ........ H04W 36/0061 |
| 2011/0207452 | A1 | 8/2011 | Grob-Lipski et al. |
| 2014/0308955 | A1 | 10/2014 | Won et al. |
| 2015/0079990 | A1* | 3/2015 | Yun .................. H04W 36/0083 |
| | | | 455/436 |
| 2015/0296439 | A1 | 10/2015 | Shen et al. |
| 2016/0157143 | A1 | 6/2016 | Olofsson et al. |

FOREIGN PATENT DOCUMENTS

WO    2014163571 A1    10/2014

OTHER PUBLICATIONS

International Searching Authority, International Search Report and Written Opinion, PCT Patent Application PCT/US2019/021488, dated Jun. 24, 2019, 10 pages.

* cited by examiner

*Primary Examiner* — Sai Ming Chan
(74) *Attorney, Agent, or Firm* — Perkins Coie LLP

(57) ABSTRACT

Systems and methods are described herein for modifying cell definition tables with telecommunications networks. In response to a handover failure between cells of the network, the systems and methods determine changes have been made to a network, such as changes to various identification information for cells associated with a controlling (or serving) node of the network. For example, the systems and methods utilize ANR functions to detect the changes to the network.

20 Claims, 4 Drawing Sheets

AUTOMATICALLY MODIFYING CELL DEFINITION TABLES WITHIN NETWORKS

BACKGROUND

Automatic Neighbor Relation (ANR) functions in a telecommunications network, such as a Long Term Evolution (LTE) network, enable operators to avoid manually managing neighbor relations (NRs) between cells associated with a controlling node, such as an eNodeB element of the LTE network.

When user equipment (UE) attempts and fails a handover operation between cells (e.g., from a source cell to a target cell), the physical cell identity (PCI) information for the target cell is unknown to the ANR functionality. For example, when there is no neighbor relation table (NRT) that exists for the PCI (when the user equipment (UE) reports physical cell identity (PCI) information for the target cell, but the reported PCI is not mapped in the neighbor relation table (NRT) to any target nodes).

In conventional networks, the ANR functions request from the UE the cell global identity (CGI) for the target cell. The ANR then uses the reported CGI to build a new target cell identifier (TCI) for the target cell, and updates neighbor relation tables (NRTs) within the controlling node with the new TCI for the target cell.

However, in some cases, the NRT exists but the CGI of the target cell may have previously changed during various network processes, such as previously performed network optimization processes. In such cases, if the CGI changes, but the PCI remains unchanged, the UE will report the unchanged PCI to the controlling node, which uses the CGI information from the NRT. The controlling node, having the unchanged PCI information, will utilize corresponding TCI information, which is erroneous and obsolete (being associated with old CGI information). Thus, handover procedures to the target cell will fail, and the network will provide users with a low-quality experience, such as dropped connections, among other drawbacks.

BRIEF DESCRIPTION OF THE DRAWINGS

Embodiments of the present technology will be described and explained through the use of the accompanying drawings.

Figure 1:
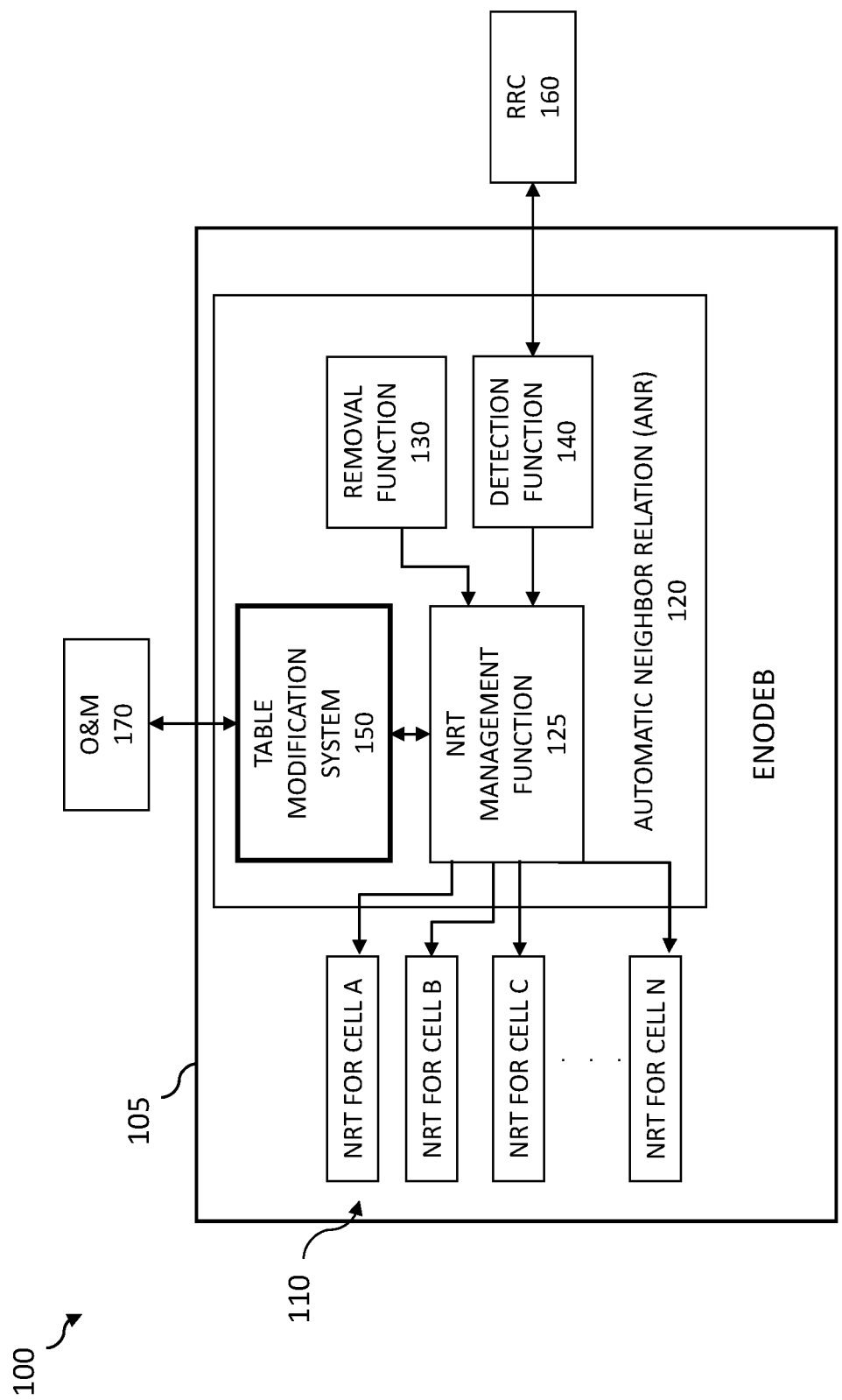
FIG. 1 is a block diagram illustrating a suitable computing environment for modifying cell definition tables with telecommunications networks.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Overview

Systems and methods are described herein for modifying cell definition tables with telecommunications networks. In response to a handover failure between cells of the network, the systems and methods determine changes have been made to a network, such as changes to various identification information for cells associated with a controlling (or serving) node of the network. For example, the systems and methods utilize ANR functions to detect the changes to the network.

Once the changes have been detected, the systems and methods automatically modify a neighbor relations table (NRT) of the controlling node with the new, changed, or modified information. Thus, future handover procedures to or using the changed cells will operate successfully. The network, therefore, utilizes Self Optimizing Network (SON) procedures, such as ANR functions, to diagnose and identify changes previously made to the network, and updates associated neighbor relation tables with the identified changes to ensure the network maintains a high quality of performance for handovers between cells, despite ongoing changes to the network.

In some embodiments, a controlling node of a telecommunications network receives an indication of an occurrence of a failure during preparation of a handover for user equipment from a source cell of the telecommunications network to a target cell of the telecommunications network. The node detects, using an automatic neighbor relation (ANR) function of the controlling node, one or more changes to the telecommunications network, such as a change to a cell identifier for the target cell. Using the detected change, the node modifies a cell definition for the target cell within a neighbor relations table (NRT) of the controlling node using the changed cell identifier detected by the automatic neighbor relation function.

For example, an eNodeB element of a Long Term Evolution (LTE) network may include components configured to perform such processes. The eNodeB may include a handover failure module that accesses an indication of an occurrence of a failure during preparation of a handover for user equipment from a source cell of the LTE network to a target cell of the LTE network. Further, the eNodeB may include a network changes module that detects, using a self-organizing network (SON) process (or other ANR process) launched by an automatic neighbor relation (ANR) function of the eNodeB element, one or more changes to the target cell of the LTE network. Also, the eNodeB element includes a table modification module that modifies a cell definition for the target cell within a neighbor relations table (NRT) of the eNodeB element based on the changes to the target cell detected by the self-organizing network (SON) process.

Thus, in some embodiments, the systems and methods facilitate the dynamic and automatic modification of cell definition tables (e.g., NRTs) within a telecommunications network, in order to harmonize the cell definition tables to ongoing changes (inadvertent, or otherwise) to the cells of the network. In doing so, the systems and methods avoid handover failures between cells due to the utilization of obsolete or erroneous identifiers for the cells, among other benefits.

In the following description, for the purposes of explanation, numerous specific details are set forth in order to provide a thorough understanding of embodiments of the present technology. It will be apparent, however, that embodiments of the present technology may be practiced without some of these specific details.

Examples of Suitable Network Environments

As described herein, in some embodiments, the systems and methods automatically update neighbor relation tables (NRTs) utilized during handover procedures for user equipment (e.g., mobile devices, such as smart phones) between cells of a telecommunications network. FIG. 1 is a block diagram illustrating a suitable computing environment 100 for modifying cell definition tables with telecommunications networks.

The network environment 100 includes an eNodeB element 105, which is a controlling or serving node with a telecommunications network, such as an LTE network. The eNodeB element 105, or eNB, may be hardware, connected to the network, which communicates with various mobile devices or handsets, such as UEs, when the devices access the network via one or more cells.

The eNodeB element 105 includes an automatic neighbor relation (ANR) function 120. Under 3GPP, the ANR function 120 performs automatic neighbor relation (NR) functions between cells of a network, such as between cells associated with the eNB 105. The ANR function 120 includes a neighbor relation table (NRT) management function 125, a neighbor detection function 140, and a neighbor removal function 130.

The neighbor detection function 140 detects new neighbors within the network and adds them to one or more neighbor relation tables (NRTs) 110 for each of the cells within the network. The neighbor removal function removes outdated NRs between cells of the network based on information provided via a radio resource control (RRC) protocol 160 of the network.

The NRT management function 125 manages, updates, and/or modifies information stored by the neighbor relation tables 110, such as NRTs associated with a cell A, a cell B, a cell C, and/or other cells (cell N) of the network and associated with the eNodeB element 105. For example, the neighbor detection function 140 may determine two cells are neighbor cells, and provides instructions to the NRT management function 125 to update the NRTs associated with the cells with their identity information, so they can be located during handover procedures for mobile devices on the network.

During a device-initiated handover, the device reports a physical layer identifier of a target cell (e.g., the cell to which the device is to be handed over) to a source cell (e.g., the currently connected cell). Via the NRT associated with the source cell (e.g., NRT for cell A), the eNodeB element 105 translates the physical layer identifier to target cell information (TCI) for the target cell. The eNodeB element 105 then utilizes the TCI of the target cell to request, prepare, and execute the handover to the target cell.

Within the eNodeB element 105, the ANR functionality 120 maintains, updates, and removes neighbor cell relations (NRs) between cells. Within the ANR 120, a neighbor cell relation between a source cell and a neighbor cell exists when the ANR knows certain identity information about a target cell: (a) in LTE networks the ECGI (enhanced cell global identity, which is the public land mobile network PLMN) ID plus the Cell Identity of the target cell; (b) in UTRAN networks the PLMN ID, Cell Identifier (C-ID), and/or resource network controller (RNC) ID/or Extended RNC ID; and (c) in GSM networks the PLMN ID, the LAC (location area code), CI (cell identity), or BSIC (base station identity code).

Further, the neighbor cell relation between a source cell and a neighbor cell exists when there is an entry in the neighbor relation table (e.g., cell A of NRTs 110) for the source cell identifying the neighbor cell, and where attributes are defined in the entry of the NRT. The attributes may include frequency information (e.g., UARFCN (UTRA Absolute Radio Frequency Channel Number), BCCH ARFCN (Broadcast Control Channel Absolute Radio Frequency Channel Number, or EARFCN (Evolved Absolute Radio Frequency Channel Number)), and/or various handover routing parameters, such as LAC and/or RAC in UTRAN networks, and TAI (tracking area identity) information in LTE networks.

For each neighbor relation of the NRT, the entry will include the target cell identifier (TCI), which identifies the neighbor cells (e.g., a UTRAN, LTE or GSM cell).

Thus, maintaining accurate and updated information associated with cells of a network enables the NRTs 110 to perform accurate and reliable translations of cell identifiers during handover procedures. The systems and methods, therefore, provide, via the eNodeB element 105, a table modification system 150 configured to modify the information stored in the NRTs 110 for the cells of the network. In some cases, the system 150 may be part of the eNodeB element 105. In other cases, the system 150 may be accessible to the eNodeB element 105, such as via the ANR function 120.

In some cases, the table modification system 150 receives from an Operations and Management (O&M) component 170 various network information, such as network statistics associated with network performance, event management actions, and so on. Further details regarding the performance or functionality of the table modification system 150 are described herein.

FIG. 1 and the discussion herein provide a brief, general description of a suitable computing environment in which the eNodeB element 105 or other components can be supported and implemented. Although not required, aspects of the various components or systems are described in the general context of computer-executable instructions, such as routines executed by a general-purpose computer, e.g., mobile device, a server computer, or personal computer. The system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Portions of the system may reside on a server computer, while corresponding portions may reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

In some embodiments, the devices may include network communication components that enable the devices to communicate with remote servers or other portable electronic devices by transmitting and receiving wireless signals using a licensed, semi-licensed, or unlicensed spectrum over communications networks. In some cases, the telecommunication network may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The communications network may also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), 5G mobile communications network, IEEE 802.11 (WiFi), or other 3GPP or non-3GPP communications networks.

Examples of Modifying Cell Definition Tables within Networks

As described herein, in some embodiments, a handover procedure for a mobile device and between a source cell and a target cell fails. Before the handover procedure, the TCI or another cell identifier of the target cell may have previously changed during various network processes, such as previously performed network optimization processes. For example, in LTE networks, the eNodeB ID or local cell ID may change for the cell, in UMTS networks, the Cell ID, LAC, RAC, or RNC may change for the cell, and for GERAN networks, the Cell ID or LAC may change for the cell. Examples of other changed identifiers or other parameters are described herein.

The table modification system 150, however, utilizes the ANR function 120 to detect the changes to the network, and modify neighbor relation tables associated with the target cell to include the changed information. Thus, future handover procedures between the cells will succeed, enhancing the performance of the network, despite continuous changes being made to the network.

Figure 2:
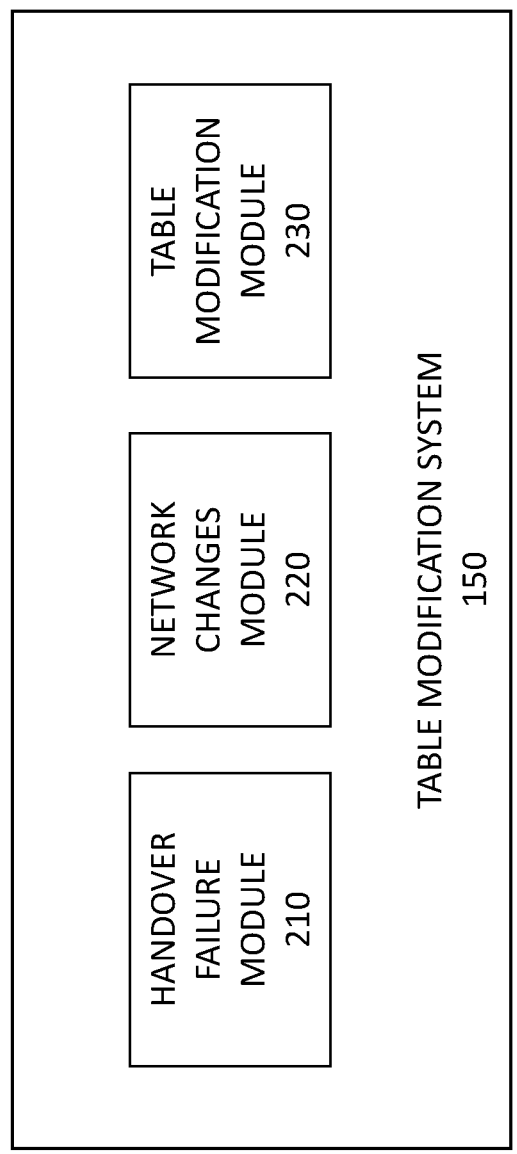
FIG. 2 is a block diagram illustrating various modules of a table modification system.

FIG. 2 is a block diagram illustrating various modules of the table modification system 150. The table modification system 150 includes functional modules or engines that are implemented with a combination of software (e.g., executable instructions, or computer code) and hardware (e.g., at least a memory and processor). Accordingly, as used herein, in some examples a module or engine is a processor-implemented module or set of code and represents a computing device having a processor that is at least temporarily configured and/or programmed by executable instructions stored in memory to perform one or more of the particular functions that are described herein. For example, the table modification system 150 may include a handover failure module 210, a network changes module 220, and a table modification module 230.

In some embodiments, the handover failure module 210 is configured and/or programmed to access an indication of an occurrence of a failure during preparation of a handover for user equipment from a source cell of a network to a target cell of the network. For example, the handover failure module 210 determines a handover procedure has failed during a preparation phase of the procedure, such as during provisioning of the target cell using erroneous or obsolete information for the target cell translated by the NRT 110.

In some embodiments, the network changes module 220 is configured and/or programmed to detect, using a self-organizing network (SON) process or other automatic neighbor relation (ANR) functionality 120 of the eNodeB element 105, one or more changes to the target cell of the network. For example, the network changes module 220 identifies changed identity information for cells within the network.

As described herein, the ANR function 120 receives information from cells broadcasting their identity on a global level (e.g., broadcasting their E-UTRAN Cell Global Identifier (ECGI) or CGI information). The eNodeB element 105 requests that the UE (e.g., mobile devices) collect the broadcasted information. First, the UE may send to the eNodeB element 105 a report that includes a target cell's PCI (but not its ECGI or CGI). Upon receipt of the PCI, the eNodeB element 105 instructs the UE, using the PCI for the target cell, to identify the ECGI, the TAC, and any PLMN ID(s) for any related neighbor cells.

Once the UE determines the ECGI information for the neighbor cells, the UE sends the ECGI information to the eNodeB element 105, as well as any tracking area code (TAC) information and all detected PLMN IDs. Also, when a neighbor cell is a CSG or hybrid cell, the UE reports the CSG ID to the eNodeB element 105. Thus, the ANR function 120 operates to cause the UE to detect and provide identity information for cells within the network, such as for a target cell and various neighbor cells to the target cell.

Of course, in non-LTE networks, other elements corresponding to the eNodeB may store the NR information and perform the functions described herein (e.g., with respect to the eNodeB element 105). For example, in WCDMA networks, a resource network controller (RNC) includes the systems described herein, and in GSM networks, the base station controller (BSC) includes the systems described herein.

In some embodiments, the table modification module 230 is configured and/or programmed to modify a cell definition for the target cell within a neighbor relations table (NRT) 110 of the eNodeB element 105 based on the changes to the target cell detected by the ANR functionality 120. For example, the table modification module 230 causes the NRT management function 125 to access and modify an NRT associated with the target cell with the updated information for the cell.

Figure 3:
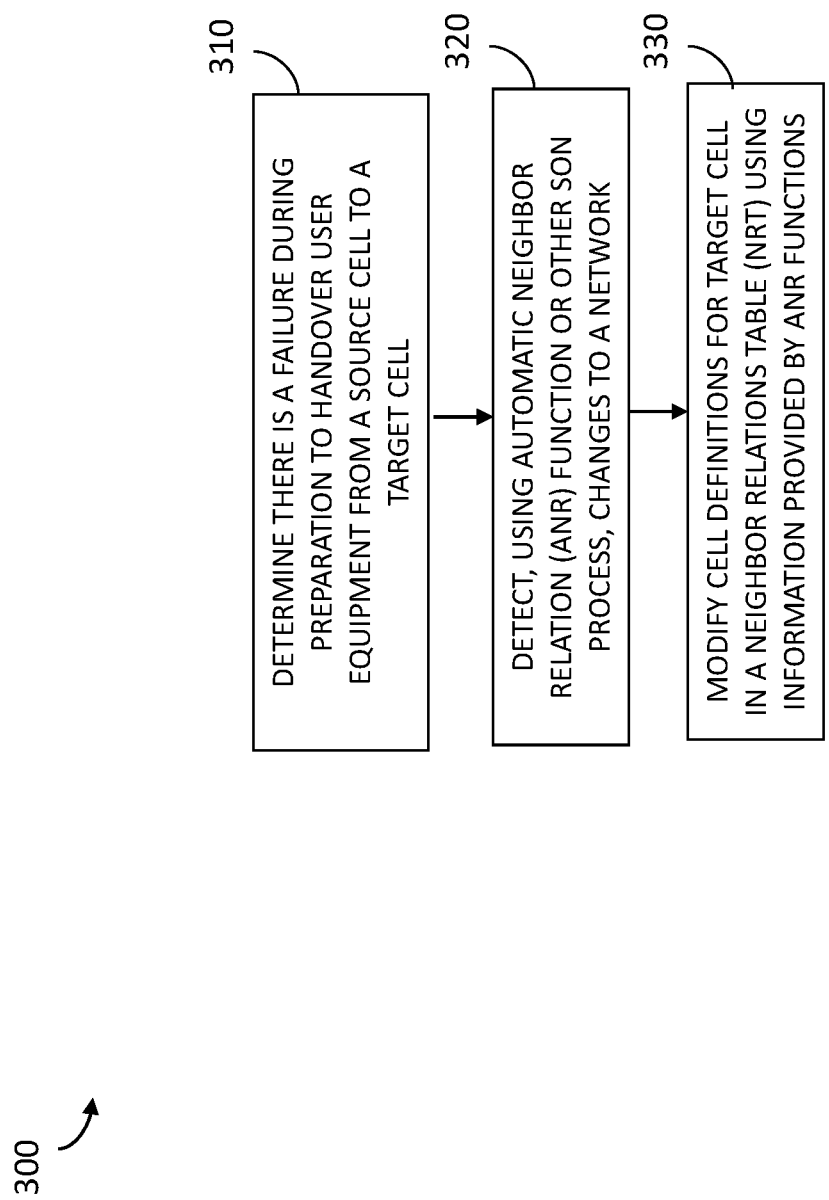
FIG. 3 is a flow diagram illustrating a method for modifying cell definition tables for a telecommunications network.

As described herein, the table modification system 150 may perform various processes, routines, or algorithms when automatically updating neighbor relation tables for cells of a network. FIG. 3 is a flow diagram illustrating a method 300 for modifying cell definition tables for a telecommunications network. The method 300 may be performed by the table modification system 150 and, accordingly, is described herein merely by way of reference thereto. It will be appreciated that the method 300 may be performed on any suitable hardware.

In operation 310, the table modification system 150 determines there is a failure during preparation of handover of user equipment from a source cell to a target cell. The system 150 could determine the handover preparation failure, for example, by receiving an indication of an occurrence of a failure during preparation of a handover for user equipment from a source cell of the telecommunications network to a target cell of the telecommunications network. For example, the handover failure module 210 may determine a handover procedure has failed during a preparation phase of the procedure (e.g., a source eNodeB receives a "cell not available" radio layer message from the target eNodeB), such as during provisioning of the target cell using erroneous or obsolete information for the target cell translated by the NRT 110. Such information may be received from the UE.

In operation 320, the system 150 detects, during one or more SON processes (e.g., an automatic neighbor relation (ANR) function of the controlling node), one or more changes to the telecommunications network. For example, the network changes module 220 identifies changed identity information for cells within the network, such as changes to a cell identifier for the target cell.

As described herein, the system 150 may detect various changes to cells of a network, including one or more changes to a physical layer identifier for the target cell, one or more changes to cell identity information for the target cell, one or more changes to target cell identifier (TCI) information for the target cell, and other information described herein.

In some cases, the network changes module 220 may automatically performing a self-organizing network (SON) process to determine the one or more changes to the telecommunications network, such as in response to the received indication of the occurrence of the handover preparation failure.

In operation 330, the system 150 modifies a cell definition for the target cell within a neighbor relations table (NRT) of the controlling node using the changed cell identifier detected by the automatic neighbor relation function. For example, the table modification module 230 causes the NRT management function 125 to access and modify an NRT associated with the target cell with the updated information for the cell.

As described herein, the system 150 may modify various information contained in the NRTs 110 for a given cell. The system 150 may modify and/or broadcast the TCI information for the cell, such as control channel (BCCH) information, primary scrambling code (PSC) information, or physical cell identity (PCI) information for the target cell within the neighbor relations table of the controlling node.

Figure 4:
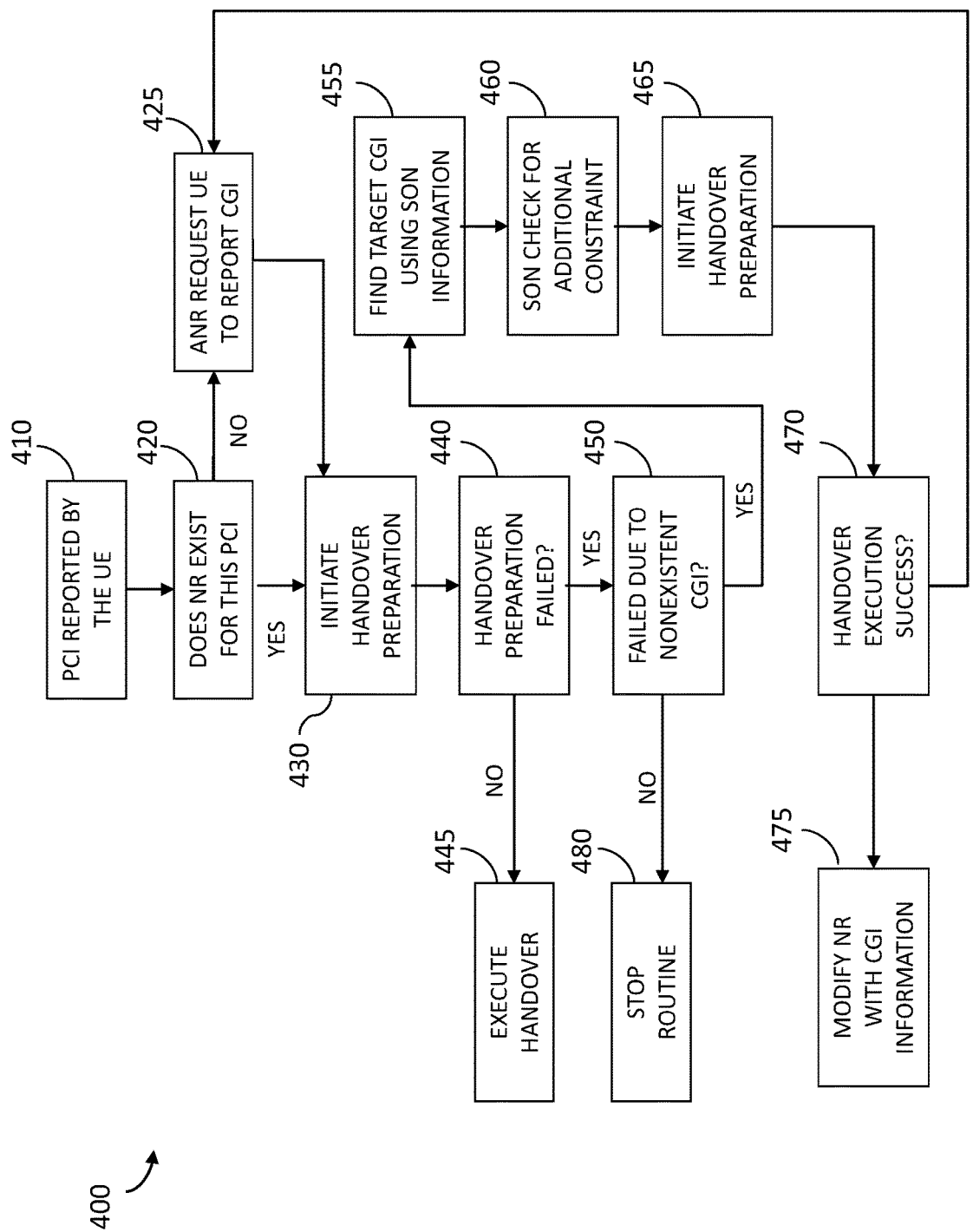
FIG. 4 is a flow diagram illustrating a method for determining changes to a telecommunications network using automatic neighbor relation (ANR) functionality.

As described herein, the table modification system 150 utilizes ANR and other SON processes to detect changes to cell identifiers for cells within a network and update associated neighbor relation tables 110 to reflect the changes within the network. FIG. 4 is a flow diagram illustrating a method 400 for determining changes to a telecommunications network using automatic neighbor relation (ANR) functionality. The method 400 may be performed by the table modification system 150 and, accordingly, is described herein merely by way of reference thereto. It will be appreciated that the method 400 may be performed on any suitable hardware.

In operation 410, a PCI is reported to the eNodeB element 105 by the UE during a handover request to a target cell. In operation 420, the system 150 determines whether a neighbor relation exists for the PCI. When the neighbor relation does exist, the method 400 proceeds to operation 430, and initiates a handover preparation procedure. When there is no NR, the system 150, in operation 425, via an ANR process, requests the UE to report a CGI for the target cell, and the eNodeB element 105 builds a neighbor relation for the cell.

In operation 440, the system 150 determines whether the handover procedure fails during preparation. When the handover preparation does not fail, the UE, in operation 445, executes handover to the target cell, and commences communication over the network via the target cell.

When the handover preparation fails, the system 150 proceeds to operation 450, and determines whether the failure is due to nonexistent CGI information in the NR (e.g., where CGI information is stored in the NR for a nonexistent cell). For example, the system 150 may determine from failure messages sent between a source cell eNodeB and a target cell eNodeB (or other similar elements in other networks), that no target cell exists, the CGI information for the target cell is invalid, the preparation has expired, and so on.

When the failure is not due to the lack of CGI information, the method 400, in operation 480, ends the current routine, and informs the network of the handover failure. When the failure is due to the lack of CGI information (or other incorrect CGI information contained in the NR), the method 400 proceeds to operation 455, and determines CGI information for the target cell.

After obtaining the CGI information for the target cell, the method 400 proceeds to operation 460, and using the SON processes to determine if there are additional constraints to be imposed to reduce the determined errors. For example, the SON may impose an additional constraint of distance (e.g., the cell being <Xkm away), tier of the target, or some other restriction (e.g., disallowing handover when the target has a historical high failure rate from other cells in the network), and reduce errors by imposing such constraints.

Absent any additional constraints, the method 400, in operation 465, initiates handover preparation using the obtained CGI information.

In operation 470, the method 400 determines whether the handover preparation is successful (handover is prepared and, later, is executed). Once successful, the method 400, in operation 475, modifies the NR tables with the CGI information (associated with the successful handover execution), else the method 400 proceeds to operation 425, and requests new CGI information.

As an example, a handover is attempted between an LTE source cell and an LTE target cell. Following the systems and methods described herein, the ANR may utilize (MCC-MNC-eNBID-CIDx)+PCI+frequency information, and if the system determines one or more CID variations caused the failure (e.g., the CID changed as part of a previous network optimization process), the system executes the handover to CIDy (based on the obtained CGI information), and modifies the cell definition table for future handovers (verified later by SON processes).

As another example, a handover is attempted between an LTE source cell and a WCDMA or GSM target cell. Following the systems and methods described herein, the ANR may utilize (MCC-MNC-LACy/RACz CIDa)+PCI+frequency+other identifiers, and if the system determines one or more identifiers (e.g., CID or LAC or RAC) and/or associated variation caused the failure (e.g., the CID/LAC/RAC changed as part of a previous network optimization process), then the system prepares the handover to (MCC-MNC-LACb/RACc CIDd) and modifies the cell definition table for future handovers (verified later by SON processes).

Thus, in some embodiments, the systems and methods utilize the ANR functionality via SON processes of a controlling or serving node of a network to identify changes to cells that result in handover failures between the cells. The systems and methods then update neighbor relations tables with the identified changes, to prevent future handover failures between the cells. The systems and methods, therefore, maintain accurate and/or optimized neighbor relations tables for a group of cells while the cells (and their associated network) continuously changes, among other benefits.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method performed by a controlling node of a telecommunications network, the method comprising:
   receiving an indication of a handover preparation failure during preparation of a handover for user equipment from a source cell of the telecommunications network to a target cell of the telecommunications network;
   in response to receiving the indication of the handover preparation failure during preparation of the handover, detecting, using an automatic neighbor relation (ANR)

function of the controlling node, one or more changes to the telecommunications network,
wherein the one or more changes include at least one change to a cell identifier for the target cell; and
modifying a cell definition for the target cell within a neighbor relations table (NRT) of the controlling node using the changed cell identifier detected by the automatic neighbor relation function.

2. The method of claim 1, wherein the automatic neighbor relation (ANR) function is part of a self organizing network (SON) process that determines the one or more changes to the telecommunications network,
wherein the controlling node automatically performs the SON process in response to the received indication of the handover preparation failure.

3. The method of claim 1, wherein the telecommunications network is a Long Term Evolution (LTE) radio access network, and the controlling node is an eNodeB element of the LTE network.

4. The method of claim 1, wherein the one or more changes to the cell identifier for the target cell include changes to one or more physical layer identifiers for the target cell.

5. The method of claim 1, wherein the one or more changes to the cell identifier for the target cell include a change to cell identity information for the target cell.

6. The method of claim 1, wherein the one or more changes to the cell identifier for the target cell include a change to target cell identifier (TCI) information for the target cell.

7. The method of claim 1, wherein modifying the cell definition for the target cell within a neighbor relations table (NRT) of the controlling node includes modifying, using a NRT management function component of the controlling node, broadcast control channel (BCCH) information, primary scrambling code (PSC) information, or physical cell identity (PCI) information for the target cell within the neighbor relations table of the controlling node.

8. The method of claim 1, wherein modifying the cell definition for the target cell within a neighbor relations table (NRT) of the controlling node includes modifying, using a NRT management function component of the controlling node, cell global identity (CGI) information or enhanced cell global identity (ECGI) information for the target cell within the neighbor relations table.

9. The method of claim 1, wherein receiving an indication of an occurrence of a failure during preparation of a handover includes receiving the indication of the handover preparation failure from the user equipment.

10. A non-transitory computer-readable medium whose contents, when executed by a controlling node of a telecommunications network, cause the controlling node to perform operations, the operations comprising:
receiving an indication of a handover preparation failure during preparation of a handover for user equipment from a source cell of the telecommunications network to a target cell of the telecommunications network;
in response to receiving the indication of the handover preparation failure during preparation of the handover, detecting, using an automatic neighbor relation (ANR) function of the controlling node, one or more changes to the telecommunications network,
wherein the one or more changes include at least one change to a cell identifier for the target cell; and
modifying a cell definition for the target cell within a neighbor relations table (NRT) of the controlling node using the changed cell identifier detected by the automatic neighbor relation function.

11. The non-transitory computer-readable medium of claim 10, wherein detecting one or more changes to the telecommunications network includes automatically performing a self organizing network (SON) process to determine the one or more changes to the telecommunications network,
wherein the controlling node automatically performs the SON process in response to the received indication of the handover preparation failure.

12. The non-transitory computer-readable medium of claim 10, wherein the telecommunications network is a Long Term Evolution (LTE) radio access network, and the controlling node is an eNodeB element of the LTE network.

13. The non-transitory computer-readable medium of claim 10, wherein the one or more changes to the cell identifier for the target cell include a change to a physical layer identifier for the target cell.

14. The non-transitory computer-readable medium of claim 10, wherein the one or more changes to the cell identifier for the target cell include a change to cell identity information for the target cell.

15. The non-transitory computer-readable medium of claim 10, wherein the one or more changes to the cell identifier for the target cell include a change to target cell identifier (TCI) information for the target cell.

16. The non-transitory computer-readable medium of claim 10, wherein modifying the cell definition for the target cell within a neighbor relations table (NRT) of the controlling node includes modifying, using a NRT management function component of the controlling node, broadcast control channel (BCCH) information, primary scrambling code (PSC) information, or physical cell identity (PCI) information for the target cell within the neighbor relations table of the controlling node.

17. The non-transitory computer-readable medium of claim 10, wherein modifying the cell definition for the target cell within a neighbor relations table (NRT) of the controlling node includes modifying, using a NRT management function component of the controlling node, cell global identity (CGI) information or enhanced cell global identity (ECGI) information for the target cell within the neighbor relations table.

18. The non-transitory computer-readable medium of claim 10, wherein receiving an indication of an occurrence of a failure during preparation of a handover includes receiving the indication of the handover preparation failure from the user equipment.

19. A system, comprising:
an eNodeB element of a Long Term Evolution (LTE) network, wherein the eNodeB element is configured to execute software modules, including:
a handover failure module that accesses an indication of a handover preparation failure during preparation of a handover for user equipment from a source cell of the LTE network to a target cell of the LTE network;
a network changes module that detects, using a self-organizing network (SON) process, one or more changes to the target cell of the LTE network in response to receiving the indication of the handover preparation failure during preparation of the handover; and
a table modification module that modifies a cell definition for the target cell within a neighbor relations table (NRT) of the eNodeB element based on the changes to the target cell detected by the self-organizing network (SON) process.

20. The system of claim 19, wherein the table modification module modifies the cell definition for the target cell with cell global identity (CGI) information or enhanced cell global identity (ECGI) information identified by the network changes module.

\* \* \* \* \*